US009127806B2

(12) United States Patent
Bergreen (10) Patent No.: US 9,127,806 B2
(45) Date of Patent: Sep. 8, 2015

(54) PROVIDING A RAIL MOUNTING SYSTEM FOR A MOBILE DEVICE CASE (71) Applicant: Brooks Bergreen, Vancouver (CA)

(72) Inventor: Brooks Bergreen, Vancouver (CA)

(73) Assignee: Hit Technologies Inc., Vancouver (CA)

( * ) Notice: Subject to any disclaimer, the term of this patent is extended or adjusted under 35 U.S.C. 154(b) by 34 days.

(21) Appl. No.: 13/750,706

(22) Filed: Jan. 25, 2013

(65) Prior Publication Data

US 2013/0200224 A1 Aug. 8, 2013

Related U.S. Application Data (60) Provisional application No. 61/591,244, filed on Jan. 26, 2012.

(51) Int. Cl.
*A47F 5/00* (2006.01)
*F16M 13/02* (2006.01)
*F16B 17/00* (2006.01)
*F16M 11/00* (2006.01)
*F16M 11/04* (2006.01)
*F16M 11/10* (2006.01)

(52) U.S. Cl.
CPC ............. *F16M 13/022* (2013.01); *F16B 17/00* (2013.01); *F16M 11/00* (2013.01); *F16M 11/041* (2013.01); *F16M 11/10* (2013.01); *F16M 2200/022* (2013.01); *Y10T 29/49826* (2015.01); *Y10T 403/7075* (2015.01)

(58) Field of Classification Search
CPC F16M 11/18; F16M 11/041; F16M 2200/022

USPC ............................. 248/122.1, 309.1; 403/376
See application file for complete search history.

(56) References Cited

U.S. PATENT DOCUMENTS

| 3,773,402 | A | | 11/1973 | Gela et al. |
|---|---|---|---|---|
| 4,155,626 | A | | 5/1979 | Grech |
| 4,172,485 | A | | 10/1979 | Mathieu |
| 4,443,085 | A | | 4/1984 | Tomori et al. |
| 4,582,411 | A | | 4/1986 | Ohmura et al. |
| 5,265,720 | A | | 11/1993 | Meliconi |
| 5,560,572 | A | * | 10/1996 | Osborn et al. ............... 248/27.3 |
| 5,708,707 | A | * | 1/1998 | Halttunen et al. ........... 379/446 |
| 5,996,184 | A | | 12/1999 | Mah et al. |
| 6,043,626 | A | * | 3/2000 | Snyder et al. ................. 320/113 |
| 7,453,510 | B2 | | 11/2008 | Kolehmainen et al. |
| 7,472,458 | B2 | * | 1/2009 | Oddsen, Jr. ..................... 16/255 |
| 7,515,402 | B2 | * | 4/2009 | Tsuo .............................. 349/60 |

(Continued)

FOREIGN PATENT DOCUMENTS

WO WO2012139055 10/2012

OTHER PUBLICATIONS

International Search Report and Written Opinion of the International Searching Authority mailed Jun. 20, 2012 in Patent Cooperation Treaty Application No. PCT/US2012/032614 filed Apr. 6, 2012.

*Primary Examiner* — Joanne Silbermann
(74) *Attorney, Agent, or Firm* — Carr & Ferrell LLP (57) ABSTRACT

A rail mounting system apparatus and method for a mobile device case and accessory is provided, which includes at least one case rail, at least one case slot configured to receive an accessory rail. The rail mounting system also includes a locking mechanism to secure the mobile device case and the accessory. The locking mechanism may be disengaged through use of a release mechanism.

18 Claims, 10 Drawing Sheets

(56) References Cited

U.S. PATENT DOCUMENTS

| | | |
|---|---|---|
| 7,594,576 B2 | 9/2009 | Chen et al. |
| 7,677,509 B2 * | 3/2010 | Jang .................. 248/176.1 |
| 7,967,298 B2 | 6/2011 | Hurlbert et al. |
| 8,483,758 B2 * | 7/2013 | Huang .................. 455/557 |
| 8,531,833 B2 * | 9/2013 | Diebel et al. .......... 361/679.56 |
| 8,770,402 B2 | 7/2014 | Bergreen et al. |
| 2002/0008920 A1 | 1/2002 | Mihara et al. |
| 2002/0136557 A1 | 9/2002 | Shimamura |
| 2003/0063396 A1 | 4/2003 | Saito |
| 2004/0136088 A1 | 7/2004 | Ohashi |
| 2004/0240080 A1 | 12/2004 | Matsui et al. |
| 2005/0030707 A1 | 2/2005 | Richardson et al. |
| 2005/0221873 A1 * | 10/2005 | Kameyama et al. ....... 455/575.4 |
| 2006/0104627 A1 | 5/2006 | Park |
| 2006/0187338 A1 | 8/2006 | May et al. |
| 2006/0268428 A1 | 11/2006 | Kuroda et al. |
| 2007/0227409 A1 * | 10/2007 | Chu .................. 108/50.02 |
| 2008/0030711 A1 | 2/2008 | Iizuka |
| 2008/0119250 A1 * | 5/2008 | Cho et al. .................. 455/575.4 |
| 2008/0310108 A1 * | 12/2008 | Eriksson et al. ............ 361/697 |
| 2009/0051319 A1 * | 2/2009 | Fang et al. .................. 320/115 |
| 2009/0080153 A1 | 3/2009 | Richardson et al. |
| 2009/0109558 A1 | 4/2009 | Schaefer |
| 2009/0181729 A1 | 7/2009 | Griffin, Jr. et al. |
| 2010/0328471 A1 | 12/2010 | Boland et al. |
| 2012/0018325 A1 | 1/2012 | Kim |
| 2012/0105979 A1 | 5/2012 | Huang et al. |
| 2012/0257008 A1 | 10/2012 | Taylor |
| 2013/0193006 A1 | 8/2013 | Bergreen et al. |
| 2014/0038222 A1 * | 2/2014 | Alt et al. .................. 435/29 |
| 2014/0174846 A1 * | 6/2014 | Molinaro .................. 181/177 |

* cited by examiner

PROVIDING A RAIL MOUNTING SYSTEM FOR A MOBILE DEVICE CASE

CROSS-REFERENCE TO RELATED APPLICATION

This application claims the benefit of U.S. provisional application No. 61/591,244 filed Jan. 26, 2012 and entitled "Providing a Rail Mounting System for a Mobile Device Case." This application is related to U.S. non-provisional patent application Ser. No. 13/359,373 filed Jan. 26, 2012 and entitled "Waterproof Protective Case for a Mobile Device," which issued as U.S. Pat. No. 8,770,402 on Jul. 8, 2014. All of the aforementioned applications are incorporated by reference herein.

BACKGROUND

Field of Invention

The present invention relates generally to mobile devices cases, and more particularly to a rail mounting system and method for a mobile device case.

SUMMARY

Various embodiments of the invention comprise an apparatus and method for a mobile device protective case and accessory having a rail mounting system are provided. The position of the mobile device case in relation to the accessory may be described in one of three states: disengaged, engaged, and locked. The rail mounting system attaches a mobile device case to an accessory with the use of a case rail on the mobile device case. The case rail on the mobile device case being configured to interact with a corresponding accessory slot on the accessory. The mobile device case and the accessory are engaged when a case rail is received by an accessory slot.

The rail mounting system may also engage the mobile device case to the accessory with the use of a case slot on the mobile device case. The case slot on the mobile device case being configured to interact with a corresponding accessory rail on the accessory. The mobile device case and the accessory are engaged when a case slot receives an accessory rail.

The mobile device case may be in a disengaged position with the accessory, when the case rails and the accessory slots are not in contact with each other. When the case slots and accessory rails are not in contact with each other, the mobile device case and the accessory are also disengaged.

The mobile device case and the accessory may be in a locked position by engaging a locking mechanism. The locking mechanism may secure the accessory to the mobile device and prevent removal unless a release mechanism is activated.

DETAILED DESCRIPTION

While this invention is susceptible of embodiment in many different forms, there are shown in the drawings and will herein be described in detail several specific embodiments with the understanding that the present disclosure is to be considered as an exemplification of the principles of the invention and is not intended to limit the invention to the embodiments illustrated. According to exemplary embodiments, the present technology relates generally to a rail mounting system for mobile device cases. More specifically, the present invention provides a system to secure a mobile device case to an accessory using a rail mounting system.

It will be understood that like or analogous elements and/or components referred to herein may be identified throughout the drawings with like reference characters. It will be further understood that several of the figures are merely schematic representations of the present technology. As such, some of the components may have been distorted from their actual scale for pictorial clarity.

A user may desire to use a mobile device while performing an activity. For example, the user may wish to record the activity of the user on the mobile device through the use of any media, such as photography or video production. The activity the user is engaged in may occupy the user's hands and preclude the user's ability to hold the mobile device. Alternatively, other reasons may inhibit user from securing the mobile device to his or her person, e.g., safety, possibility of dropping mobile device, etc.

Mobile devices may include mobile phones, smart phones, tablet computers, digital cameras, MP3 players, personal digital assistants, and portable media players.

A user of a mobile device may utilize a case to minimize the damage to a user's mobile device from various sources, e.g., water, dirt, dust, shock, impact, etc. In some embodiments, the case itself may be protected from damage which may be caused by water, dirt, dust, shock, and impact.

The mobile device case may be comprised of any material, such as plastic, rubber, wood, metal, leather, other similar materials or a combination thereof. Additionally, the case may be comprised of any lightweight material which may enable the mobile device case, along with the mobile device enclosed by the case, to float on water or other liquid. The lightweight material may comprise foam, cork, other buoyant material, or a combination thereof. A mobile device case that allows the mobile device to float on water may be useful for the user when the user is performing an aquatic activity, such as swimming, scuba-diving, rowing, boating, etc.

A mobile device case utilizing a rail mounting system may be used to allow the user to employ the use of a mobile device while performing an activity. The rail mounting system secures the mobile device, encased by the mobile device case, to the user's person or other appropriate location. The user's person may include any protective gear utilized by the user, including a chest harness, a helmet, clothing, etc. In alternative embodiments, the user's person may also include any equipment utilized by the user in furtherance of the activity engaged in by the user.

The protective gear or other equipment upon which the mobile device encased by the mobile device case is to be attached may be considered an accessory. Optionally, an accessory may include any other device to secure a mobile device case, thereby allowing users to perform an activity. For example, an accessory may include an arm mount, a chest mount, a floating device, a heavy clip, a screen protector, a tripod, a bicycle mount, a car or other vehicular mount, or other similar devices.

The mobile device case may be attached to the accessory through the use of a rail mounting system. The position of the mobile device case in relation to the accessory may be described in one of three states: disengaged, engaged, and locked.

Figure 1:
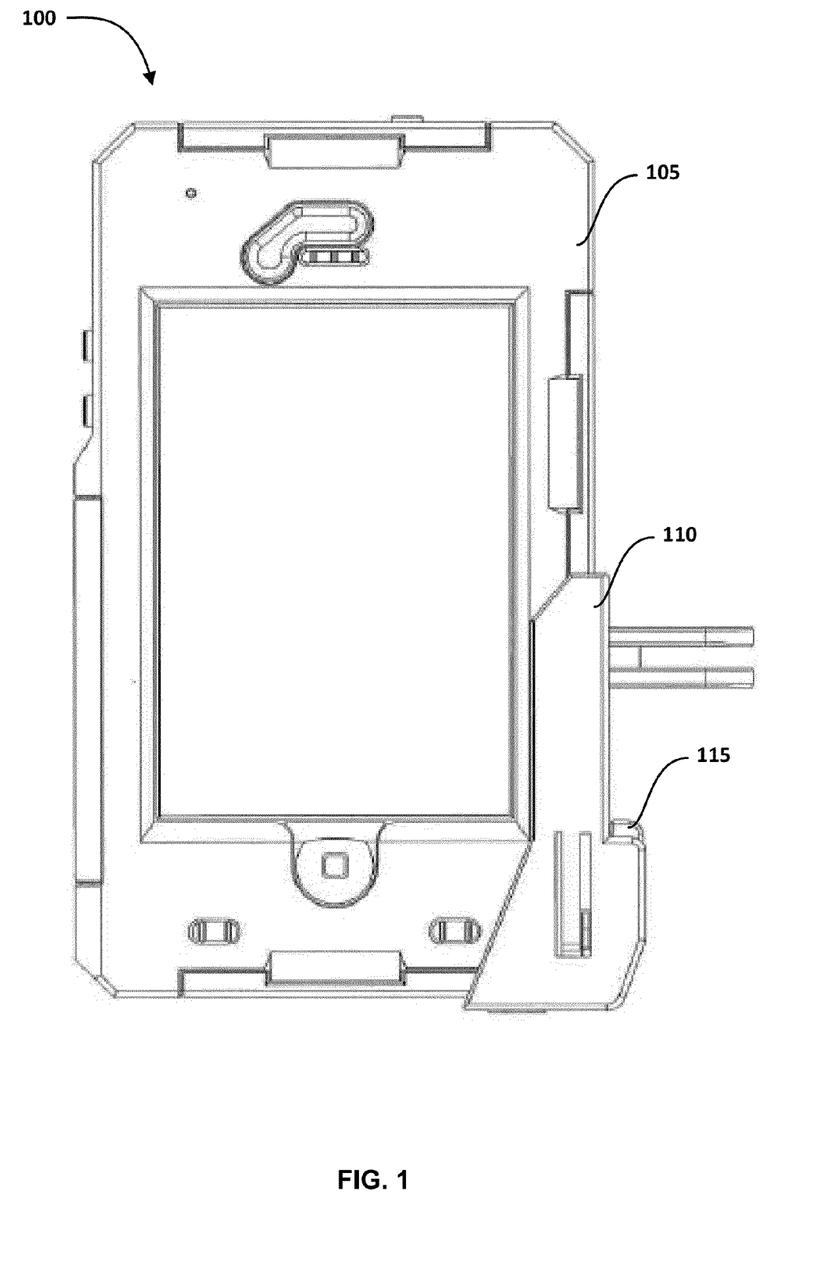
FIG. 1 shows a front view of an exemplary embodiment of a mobile device case and the accessory of the rail mounting system.

FIG. 1 illustrates a rail mounting system 100 according to an exemplary embodiment of the present invention. As depicted in FIG. 1, the rail mounting system 100 on a mobile device case 105 allows for the attachment of the mobile device case 105 to an accessory 110.

The accessory 110 may be any object that is attached to the mobile device case 105 by use of the rail mounting system 100. The accessory 110 may be any object used for positioning the mobile device case 105. Examples of the accessory 110 include an arm mount, a chest mount, a floating device, a heavy clip, a screen protector, a tripod, a bicycle mount, and a car mount. The accessory 110 may be comprised of any material, such as plastic, rubber, wood, metal, leather, or other similar materials that may comprise the mobile device case 105. A release mechanism 115 may also be located on the accessory as described further below.

Figure 2:
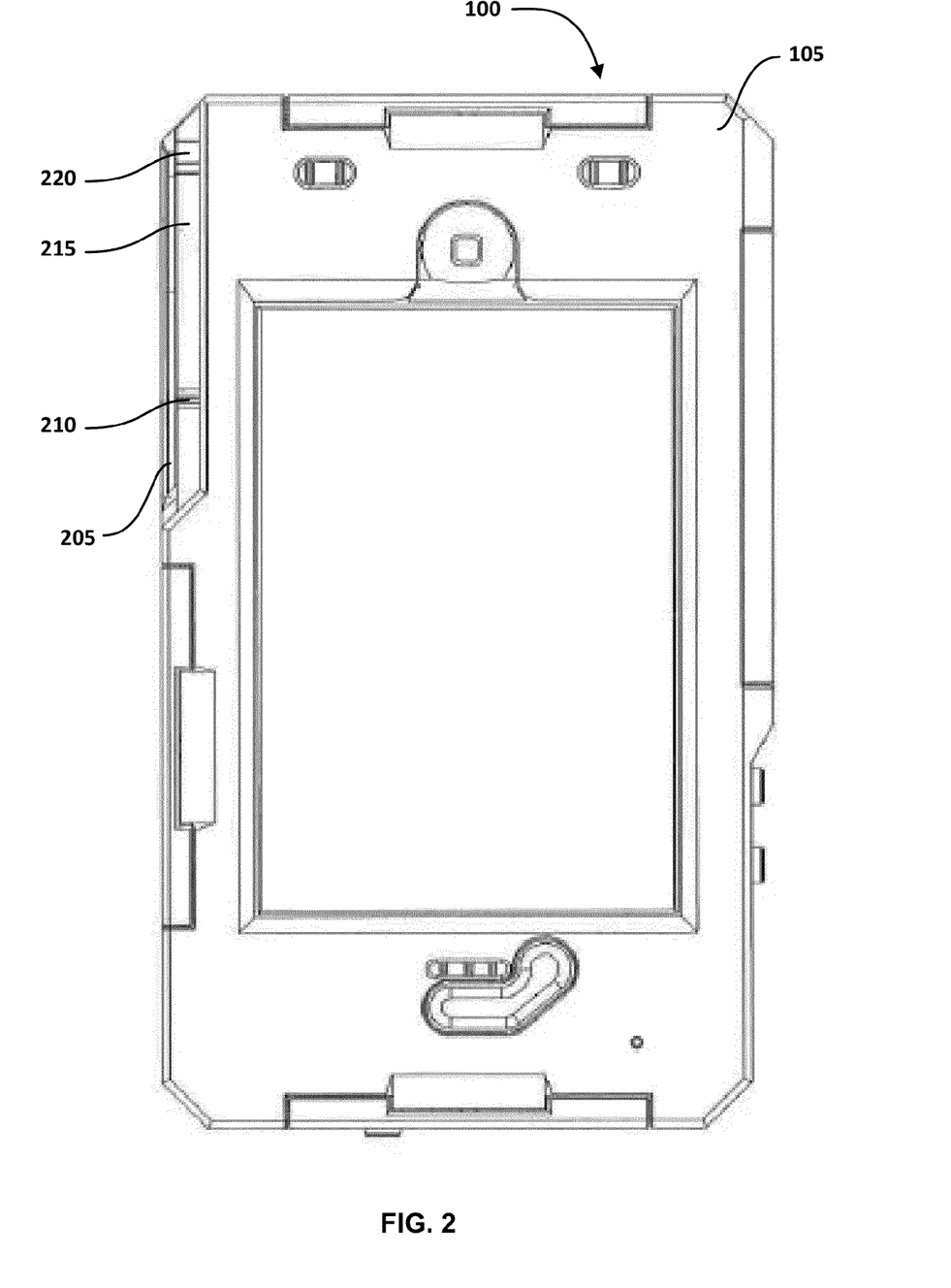
FIG. 2 shows a front view of an exemplary embodiment of the mobile device case having a rail mounting system.

FIG. 2 depicts a top view of an exemplary embodiment of a mobile device case 105 comprising a rail mounting system 100. The rail mounting system 100 for a mobile device case 105 may comprise at least one case rail 205 and at least one case slot 215. The rail mounting system 100 may also comprise a case cavity 220. Additionally, the rail mounting system 100 may comprise a groove 210.

Figure 5:
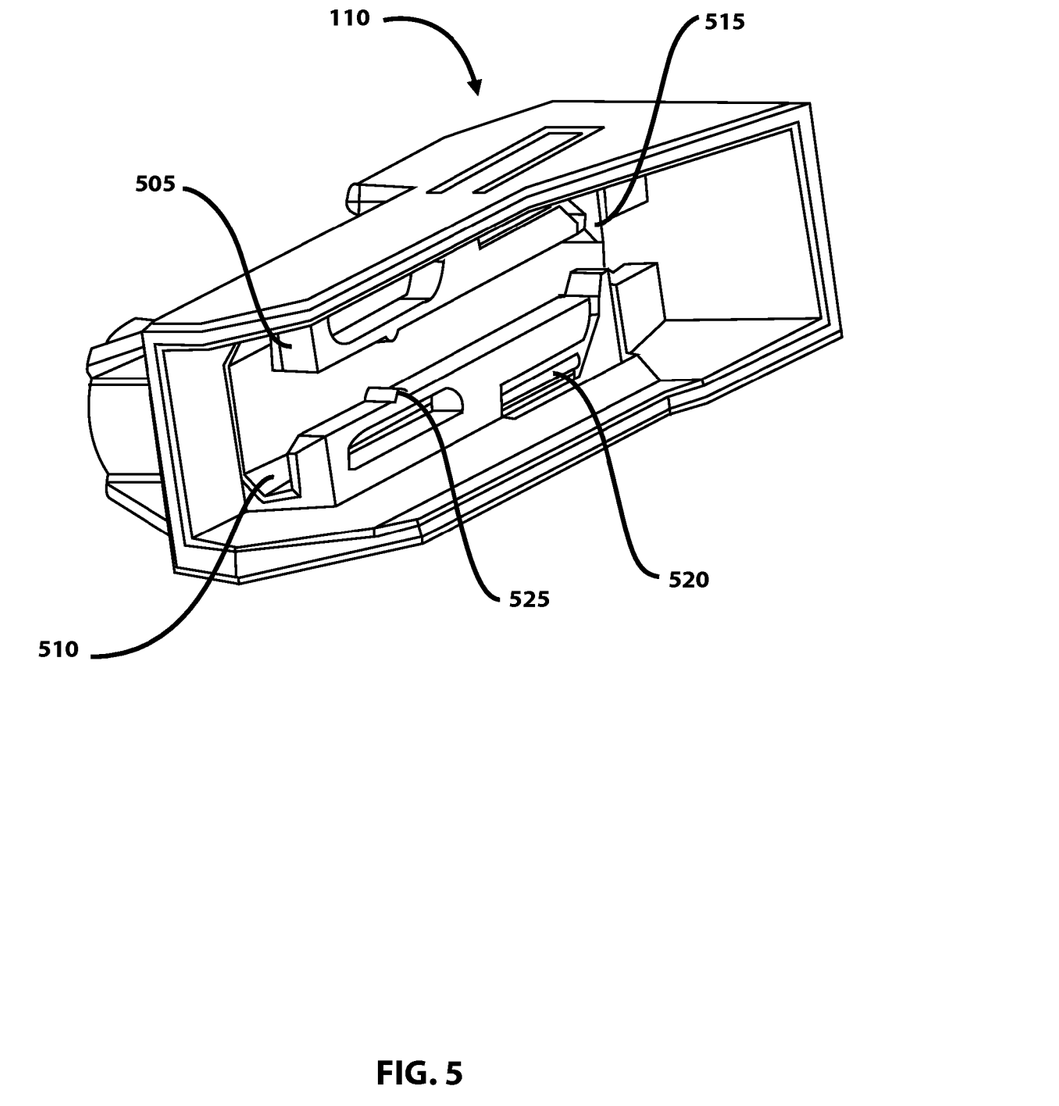
FIG. 5 shows a perspective view of an exemplary embodiment of the accessory of the rail mounting system.

FIG. 5 illustrates a perspective view of an exemplary embodiment of an accessory 110 for a rail mounting system 100. The accessory may comprise at least one accessory rail 505, at least one accessory slot 510, and a locking mechanism 515.

The accessory rail 505 may be a bar extending from one point to another point on the accessory 110. The accessory rail 505 may also be a structural member or support on the accessory 110. The accessory rail 505 may be of any length, any width, and any shape. The accessory rail 505 may be comprised of any material, such as material identical to the material of which the accessory 110 is comprised, such as plastic, rubber, wood, metal, leather, or other similar materials or a combination thereof.

Returning to FIG. 2, the rail mounting system 100 may be configured to receive an accessory rail 505 on an accessory 110. In this embodiment, the case rail 205 may be received by the accessory slot 510, such that the case rail 205 and the accessory rail 505 may be configured to slide with respect to each other; and a locking mechanism 515 that fixes a desired position of the at least one case rail 205 with respect to the accessory 110 when a locking mechanism 515 is engaged.

The case rail 205 may be implemented in various forms. In one embodiment the case rail 205 may be a bar extending from one point to another point on the mobile device case 105.

In alternate embodiments the case rail 205 may also be a structural member or support on the mobile device case 105. For example, the case rail 205 may be a L-shaped structure, comprising one case rail, or a T-shaped structure, comprising two case rails. The case rail 205 may be of any length, any width, or any shape. The case rail 205 may be comprised of any material, such as material identical to the material of which the mobile device case 105 is comprised, such as plastic, wood, rubber, metal, etc. In an alternative embodiment, a rail mounting system 100 may include a case rail 205 comprising of a series of ridges with a T-shaped cross-section interspersed with flat slots.

The case slot 215 may be a concave opening on the mobile device case 105 through which an object, such as the accessory rail 505, may be received. The case slot 215 may also be an indentation built into the mobile device case 105 that allows an object, such as the accessory rail 505, to move within the indentation and be guided by the mobile device case 105. While the embodiment depicts the case slot 215 as a rectangular indention, the case slot 215 may be of any length, any width, any depth, and any shape.

The accessory slot 510 may be an opening on the accessory 110 through which an object, such as the case rail 205, may be received. The accessory slot 510 may also be an indentation built into the accessory 110 that allows an object, such as the case rail 205, to move within the indentation and be guided by the accessory 110. The accessory slot 510 may be of any length, any width, and any shape. In one embodiment the accessory slot 510 may conform to the shape of the case rail 205.

Figure 7:
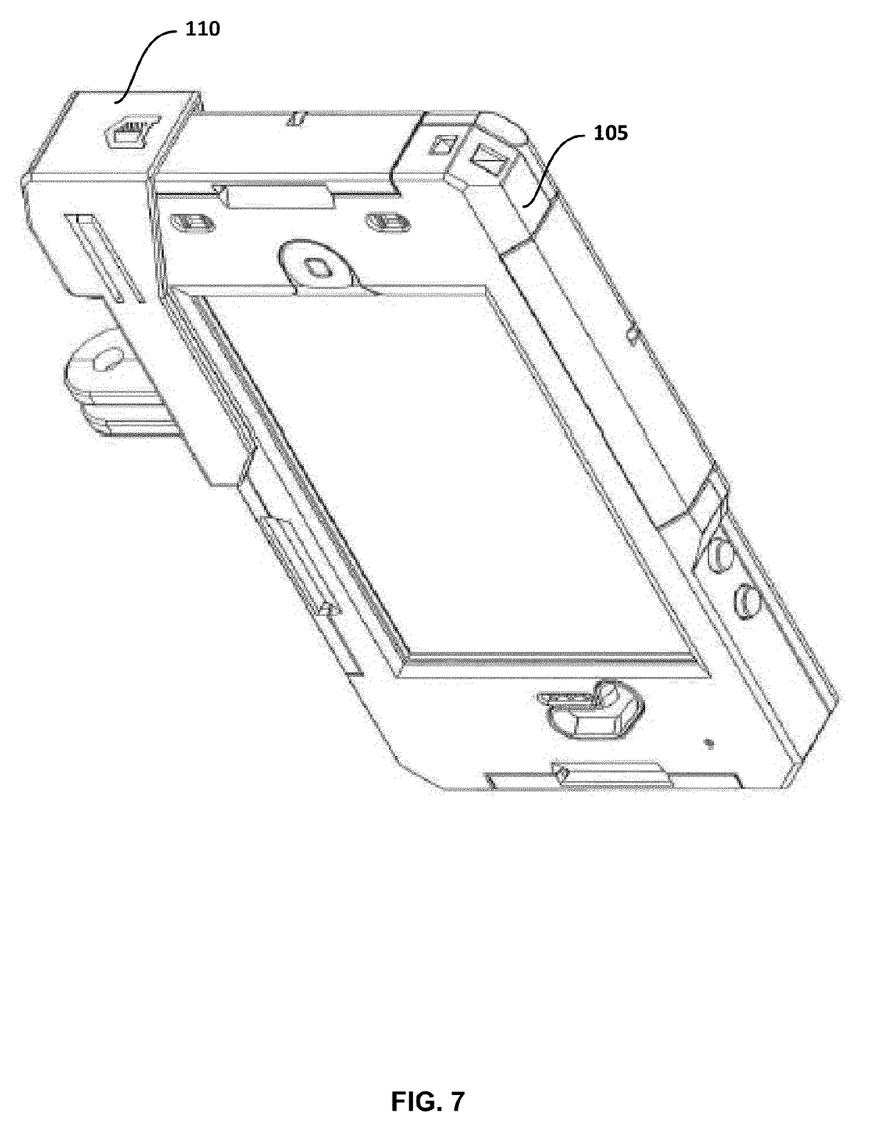
FIG. 7 shows a perspective view of an exemplary embodiment of a mobile device case and an accessory in a locked position.

In one embodiment of the rail mounting system, the accessory 110 may comprise a locking mechanism 515. The locking mechanism 515 causes the mobile device case 105 and the accessory 110 to be in a locked position with respect to each other as depicted in FIGS. 1 and 7. As part of the placing the mobile device case 105 and the accessory 110 in a locked position, the accessory rail 505 may be received by at least the case slot 215. In some embodiments the locking mechanism 515 may be comprised of at least one tooth. The tooth may be comprised of the same material as the accessory 110 and be of any shape, length, or width. The tooth may be configured to extend beyond the accessory rail 505 and to maintain an original position but be flexible to retract at least to a position even with the accessory rail 505, e.g. to attain the locked position, for release from the locked position, etc. For example, as shown in FIG. 5, accessory 110 may be configured to have openings around three sides of the locking mechanism 515 to allow lateral movement of the tooth.

Figure 4:
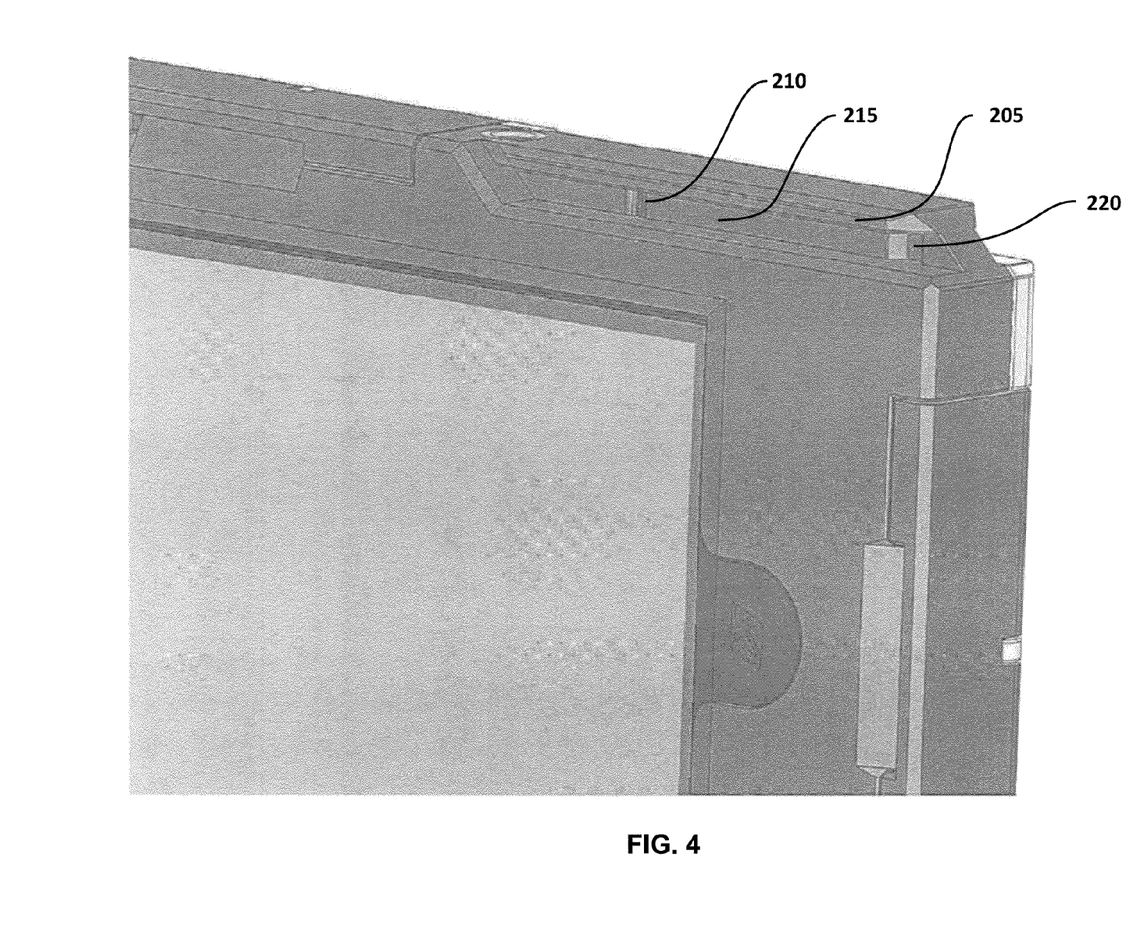
FIG. 4 shows a perspective view of an exemplary embodiment of the mobile device case having a rail mounting system.

The locking mechanism 515 may be received by at least one case cavity 220. A case cavity 220 may include an indention within the case slot 215. FIGS. 2 and 4 illustrate an exemplary embodiment of the case cavity 220. In such an embodiment, the case cavity 220 may be of any shape, length, or width such that it may correspond respectively to the locking mechanism 515.

In another embodiment, the locking mechanism 515 may comprise a spring-loaded mechanism. Further alternative embodiments of the locking mechanism 515 may comprise at least one adhesive pad, at least one suction cup, at least one buckle, at least one strap, at least one latch, at least one clip, at least one hook and loop fastener, other similar locking mechanisms or fasteners, or a combination of the aforementioned.

Figure 3:
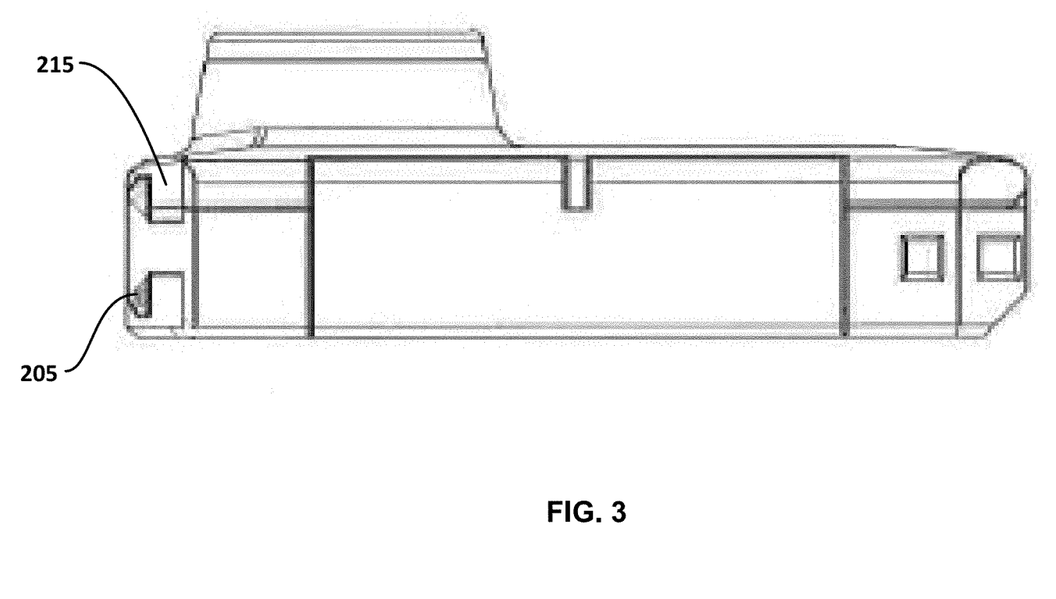
FIG. 3 shows a top view of an exemplary embodiment of the mobile device case having a rail mounting system.

FIG. 3 illustrates a top view of an exemplary embodiment of a mobile device case comprising a rail mount system. As shown, the case rail 205 and the case slot 215 may be comprised in a T-shaped structure.

As described herein and shown in FIGS. 1 and 7, the mobile device case 105 may be placed in a locked position with respect to the accessory 110 through the use of the locking mechanism 515 as part of the rail mounting system 100. In this locked position, the mobile device case 105 may not be removed from the accessory 110 without the use of the release mechanism 115.

In one embodiment, when the mobile device case 105 and accessory 110 are placed in a locked position with respect to each other, there may be an audible "clicking" sound. The clicking sound may be the sound of one or more accessory teeth being received by their respective case cavities as part of the locking mechanism 515. Optionally, other sounds may be used to indicate a locked position.

Figure 6:
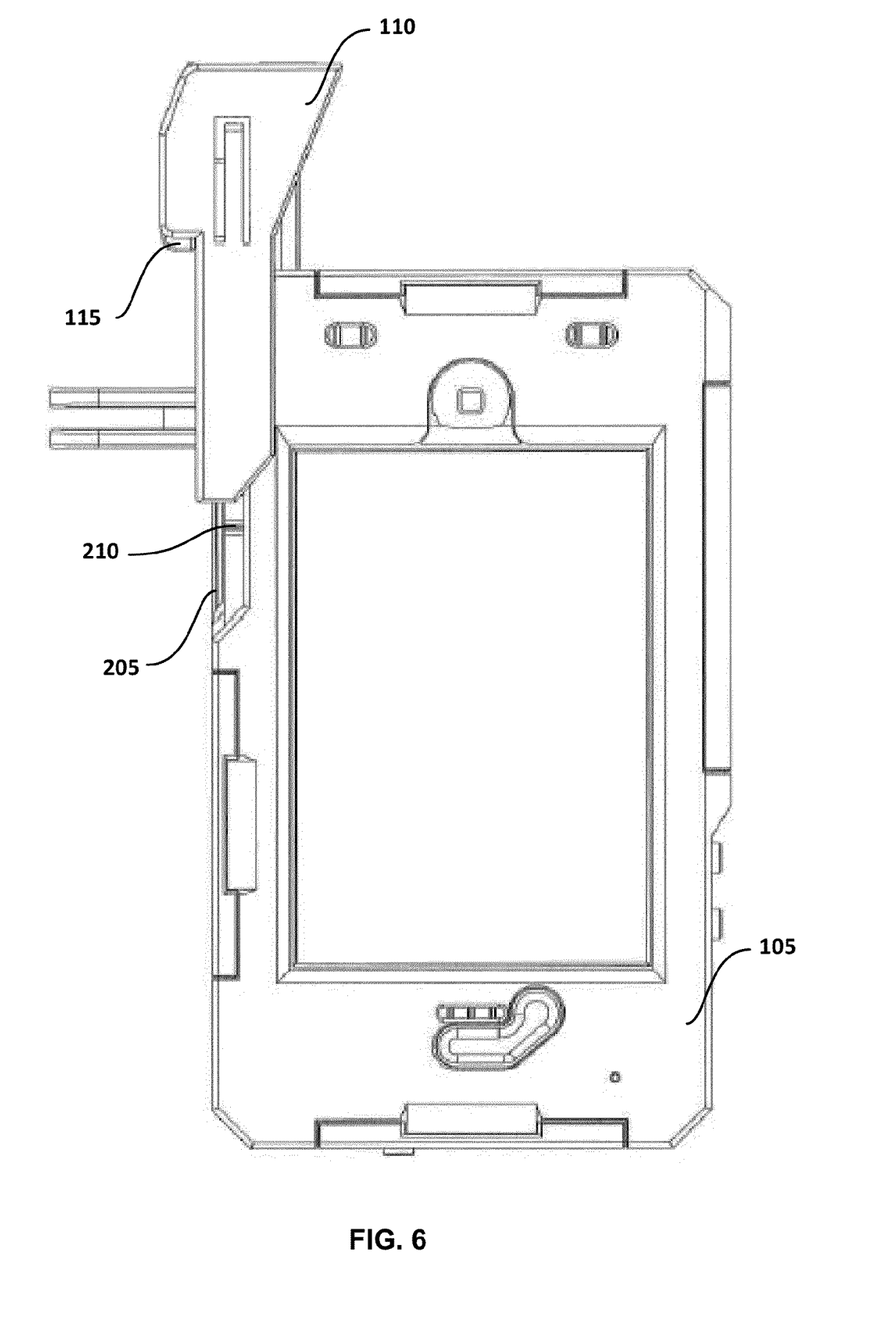
FIG. 6 shows a top view of an exemplary embodiment of the mobile device case and the accessory in an engaged position.

A release mechanism 115 may be used to disengage the locking mechanism 515, allowing the accessory 110 to be disengaged with the mobile device case 105. The release mechanism 115 may be actuated by a trigger or button. The release mechanism 115 may be located on the accessory 110. In an alternative embodiment, the release mechanism 115 may be located on the mobile device case 105. When pressure is applied to the release mechanism 115, the locking mechanism 515 is released. The release of the locking mechanism 515 may transition the rail mounting system 100 from a locked position of the mobile device case 105 and the accessory 110 with respect to each other, to an engaged position of the mobile device case 105 and the accessory 110 with respect to each other. In the engaged position, as depicted in FIG. 6, the mobile device case 105 and accessory 110 may slide to and from each other freely, allowing a user to remove the mobile device case 105 from the accessory 110.

FIG. 5 depicts an exemplary embodiment of the release mechanism 115. The release mechanism 115 may be configured to disengage the tooth or teeth comprising the locking mechanism 515. The application of pressure to a button or trigger portion of the release mechanism 115 may cause movement in a member 520 of the trigger release mechanism. The movement may be in a direction parallel to the accessory rail 505. The movement of the member 520 may induce movement of the locking mechanism 515 in a direction perpendicular relative to the accessory rail 505 such that the tooth or teeth comprising the locking mechanism 515 are retracted from the case cavity 220, allowing the accessory 110 to be removed from the mobile device case 105. Optionally, the release mechanism 115 may comprise a spring to facilitate resetting the trigger or button to its original position.

Optionally, an embodiment of the accessory 110 may comprise at least one accessory nub 525. An accessory nub 525 may be a protrusion on the accessory rail 505. The accessory tooth may be of any length, any width, and any shape. The accessory nub 525 may be comprised of any material, such as material identical to the material of which the accessory 110 is composed. The accessory nub 525 may assist the locking mechanism 515 in holding the mobile device case 105 and the accessory 110 in a locked position by interacting with a corresponding groove 210 in the case slot 215 of a mobile device case. The groove 210 may be of any length, width or shape which corresponds to the accessory nub 525. In one embodiment of an accessory 110 comprising an accessory nub 525, the accessory rail 505 may be configured to be flexible or allow for some movement of the accessory nub 525 while the rail mounting system 100 is in an engaged position.

Figure 8:
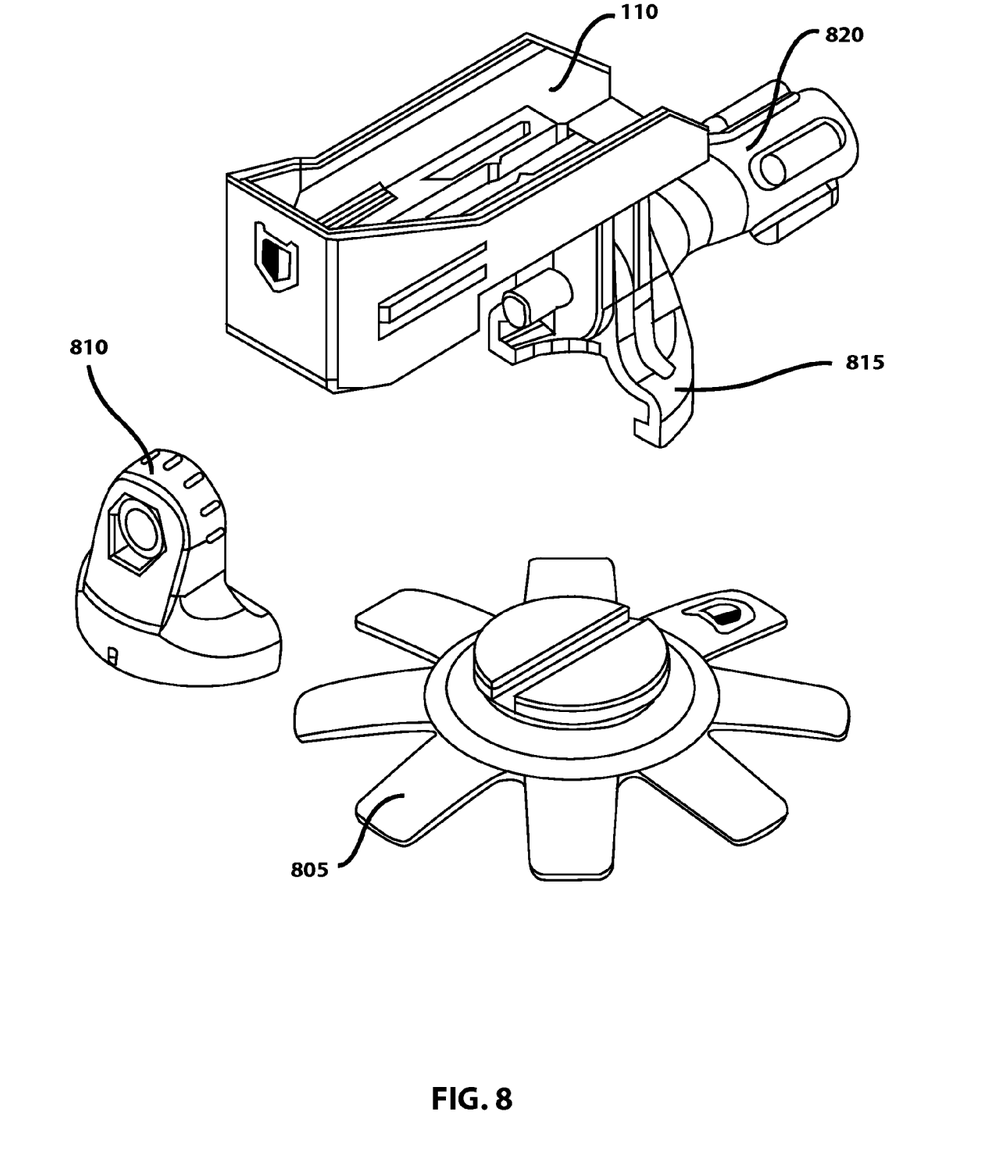
FIG. 8 shows an unassembled view of an exemplary embodiment of an accessory having a hinge, a hinge part, and a base.
Figure 9:
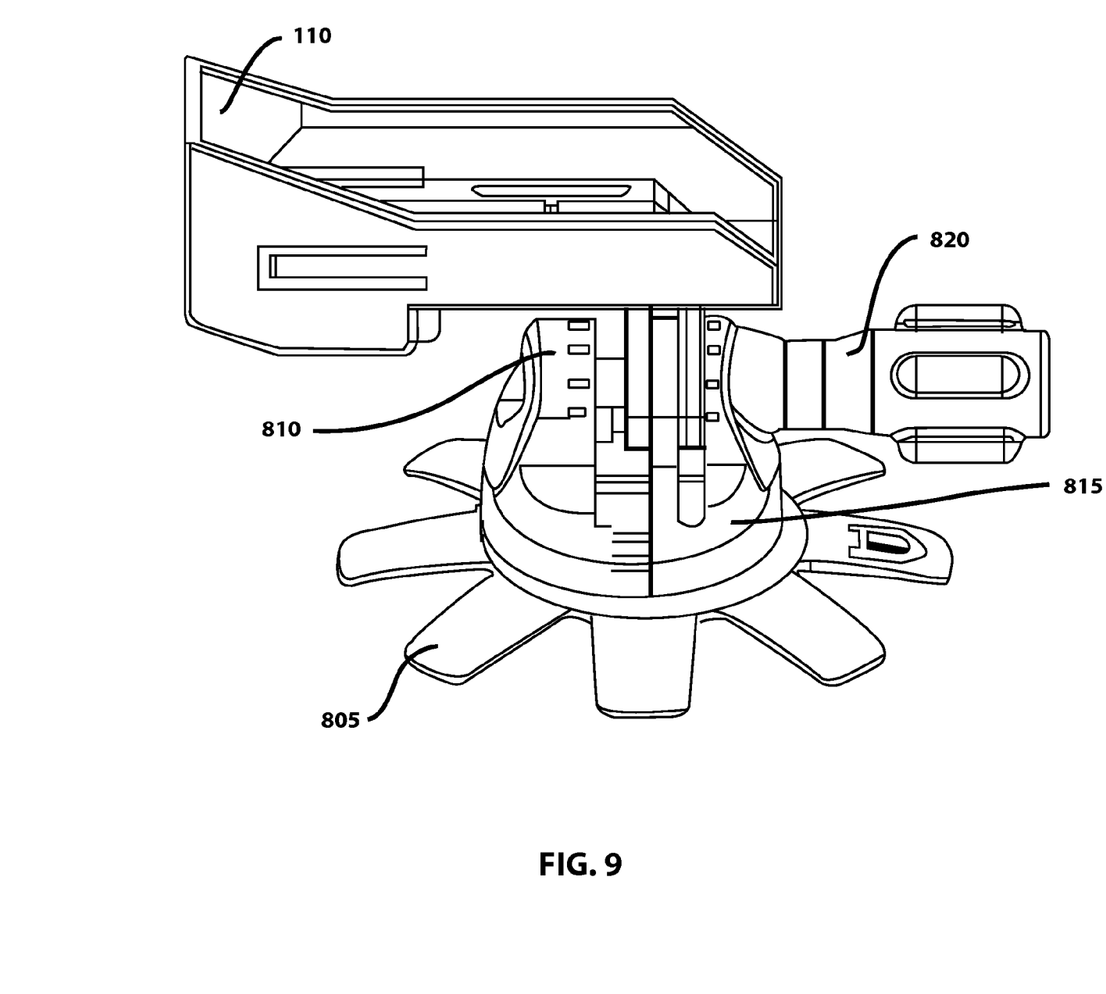
FIG. 9 shows a perspective view of an exemplary embodiment of an assembled accessory.

FIGS. 8 and 9 illustrate an unassembled and assembled exemplary embodiment of an accessory 110 and an appendage. An embodiment of the appendage may comprise a base 805, a hinge portion 810, a hinge 815, and fastener 820. The base 805, hinge portion 810, hinge 815, and fastener 820 may be comprised of any material, such as plastic, rubber, wood, metal, leather, other similar materials or a combination thereof.

The hinge portion 810 may be configured to attach to the hinge 815 to complete a hinge accessory. The attachment between the hinge portion and the may be permanent or removable. The attachment may be performed using adhesives, suction cups, a rail mount system, a hook and loop fastener, screws, magnets, pins, rods, or other similar attachment methods or a combination thereof. The base 805 may be removably coupled to the hinge portion 810 and the hinge 815. In one embodiment the coupling may be performed with the hinge portion 810 and the hinge 815 configured to surround a protrusion on the base 805, as shown in FIG. 8, forming a secure connection between the hinge portion 810, the hinge 815, and the base 805. In some embodiments, the hinge portion 810 and the hinge 815 may be configured to be rotatable around the secure connection to the base 805. In alternate embodiments, the coupling may be performed using adhesives, suction cups, a rail mount system, a hook and loop fastener, screws, magnets, pins, rods, or other similar attachment methods or a combination thereof.

The hinge 815 may also comprise a fastener 820. The hinge 815 may be configured to attach to the accessory 110 with the use of any attachment procedure, such as using adhesives, suction cups, a rail mount system, a hook and loop fastener, screws, magnets, pins, rods, or other similar attachment methods or a combination thereof. The hinge 815 may be adjustable to a plurality of positions, allowing the accessory 110 attached to the hinge 815 to be adjustable to a plurality of positions. In one embodiment the fastener 820 may serve multiple functions. For example, the fastener 820 may assist in attaching the hinge portion 810 and the hinge 815 along with serving to adjust the accessory 110 to a plurality of positions.

The base 805 may also comprise a fastener configured to attach to any object with the use of any attachment procedure, such as using hook and loop fasteners, suction cups, adhesives, magnets, thread, straps, weights, clips, fusing methods (e.g. fused plastic) or other similar attachment methods or a combination thereof.

An alternative embodiment of the accessory 110 may comprise a chest mount. The chest mount may be a support comprising an arrangement of straps for holding an object, such as a mobile device encased by the mobile device case 105, to the chest of a human being. The chest mount may be configured to attach to the mobile device case 105 with the use of any attachment device, such as using adhesives, suction cups, a rail mount system, a hook and loop fastener, screws, magnets, pins, rods, or other similar attachment methods or a combination thereof.

A further embodiment of the accessory 110 may comprise a tripod having a portable three-legged frame, which may provide stability for the mobile device encased by the mobile device case 105. The tripod may be used for both motion and still photography to prevent movement of the camera in the mobile device encased by the mobile device case 105. The tripod may also be helpful in achieving precise framing of the image captured by the camera in the mobile device encased by the mobile device case 105. The tripod may be configured to attach to the mobile device case 105 with the use of any attachment device, such as using adhesives, suction cups, a rail mount system, a hook and loop fastener, screws, magnets, pins, rods, or other similar attachment methods or a combination thereof.

Figure 10:
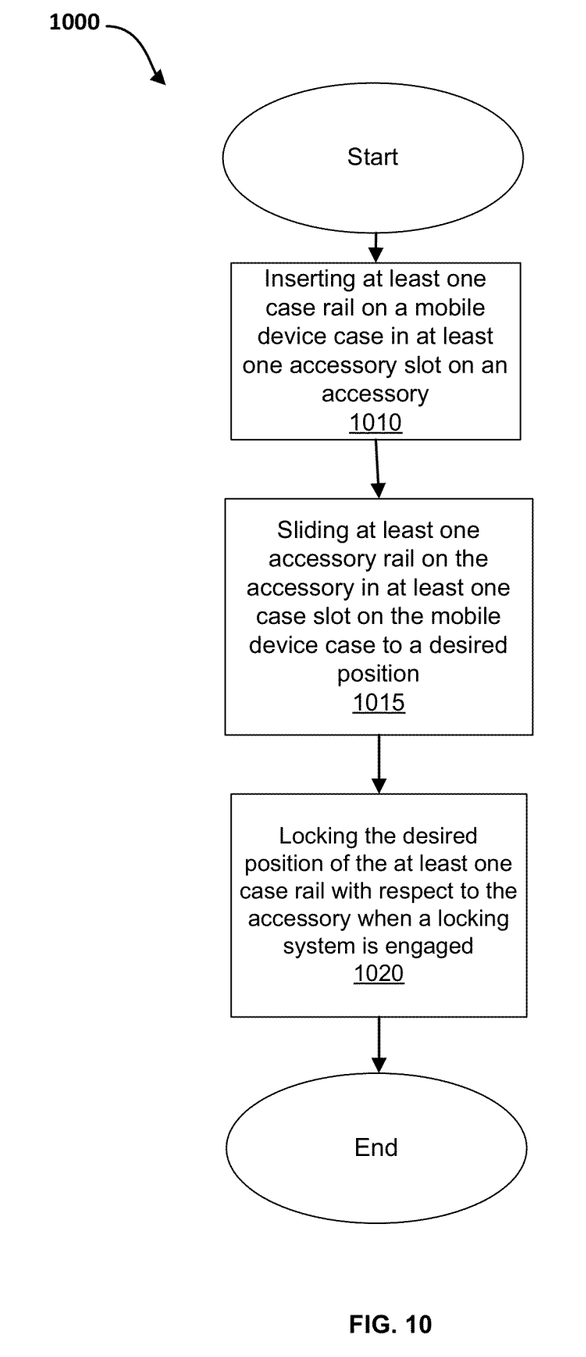
FIG. 10 illustrates an exemplary method of engaging a rail mounting system.

FIG. 10 illustrates an exemplary method 1000 of engaging the rail mounting system 100 using a mobile device case 105 and an accessory 110. The method 1000 may comprise a first step 1010 of inserting the at least one case rail 205 on the mobile device case 105 into the at least one corresponding accessory slot 510 on an accessory 110. The second step 1015 may comprise sliding at least one accessory rail 505 on the accessory 110 in at least one case slot 215 on the mobile device case 105 to a desired position. For example, a locked position. At step 1020, locking the desired position of at least one case rail 205 with respect to the accessory 110 when a locking mechanism 515 is engaged.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A rail mounting system for a mobile device case comprising:
    at least one case rail partially forming a first external side of the mobile device case, the mobile device case being hand-held and comprising:
        a backing,
        a contiguous one-piece sidewall section comprising the first external side and three additional external sides, the contiguous one-piece sidewall section attached to the backing via a hinge, and
        a cavity defined by the contiguous one-piece sidewall section;
    at least two case slots formed underneath the at least one case rail on the mobile device case receiving at least two accessory rails on a mobile device case accessory, in which the at least one case rail is received by at least one accessory slot on the mobile device case accessory such that the at least one case rail and the at least two mobile device accessory rails slide with respect to each other; and
    a locking mechanism on the mobile device case accessory, the locking mechanism located at an end of the at least two accessory rails and the at least one accessory slot that fixes a position of the at least one case rail with respect to the mobile device case accessory when the locking mechanism is engaged.

2. The rail mounting system of claim 1, in which the locking mechanism comprises at least one case cavity on the mobile device case receiving at least one tooth.

3. The rail mounting system of claim 2, in which the at least one case cavity on the mobile device case is an indentation on an inner surface of the at least one case slot on the mobile device case.

4. The rail mounting system of claim 1, further comprising a release mechanism, in which the release mechanism releases the locking mechanism when the locking mechanism is engaged such that the at least one case rail and the at least two accessory rails slide with respect to each other.

5. The rail mounting system of claim 4, in which the release mechanism releases the locking mechanism by disengaging at least one tooth from at least one corresponding case cavity.

6. An accessory for a rail mounting system for a mobile device case comprising:
    at least two accessory rails on a mobile device case accessory;
    at least one accessory slot on the mobile device case accessory, the at least one accessory slot formed underneath the at least two accessory rails, the at least one accessory slot receiving at least one case rail on the mobile device case, the mobile device case being hand-held and comprising a backing, a contiguous one-piece sidewall section comprising four external sides, the contiguous one-piece sidewall section attached to the backing via a hinge, and a cavity defined by the contiguous one-piece sidewall section, the at least two accessory rails received by at least two case slots on the mobile device case such that the at least one case rail and the at least two accessory rails slide with respect to each other; and
    a locking mechanism on the mobile device case accessory, the locking mechanism located at an end of the at least two accessory rails and the at least one accessory slot that fixes a position of the at least two accessory rails with respect to the mobile device case when the locking mechanism is engaged.

7. The mobile device case accessory of claim 6, in which the locking mechanism comprises at least one tooth inserted into at least one corresponding case cavity.

8. The mobile device case accessory of claim 6, further comprising at least one accessory nub on the mobile device case accessory, in which the at least one accessory nub is a protrusion on the at least one accessory rail.

9. The mobile device case accessory of claim 6, further comprising a release mechanism, in which the release mechanism releases the locking mechanism when the locking mechanism is engaged such that the at least two accessory rails and the at least one case rail slide with respect to each other.

10. The mobile device case accessory of claim 9, in which the release mechanism releases the locking mechanism by disengaging at least one accessory tooth from at least one corresponding case cavity.

11. The mobile device case accessory of claim 9, in which the accessory further comprises an extension configured to allow attachment of the mobile device case accessory to an appendage.

12. The mobile device case accessory of claim 11, in which the appendage comprises a base, a hinge portion, and a hinge.

13. The mobile device case accessory of claim 12, in which the hinge portion is coupled to the hinge and the hinge is coupled to the hinge portion to complete a hinge accessory.

14. The mobile device case accessory of claim 13, in which the hinge accessory is attached to the base.

15. The mobile device case accessory of claim 12, in which the base comprises a fastener.

16. The mobile device case accessory of claim 13, in which the hinge accessory is adjustable to a plurality of positions.

17. The mobile device case accessory of claim 6, in which the accessory comprises a tripod having a three-legged frame.

18. The mobile device case accessory of claim 6, in which the mobile device case accessory comprises a chest mount.

* * * * *